United States Patent Office 2,847,555
Patented Aug. 12, 1958

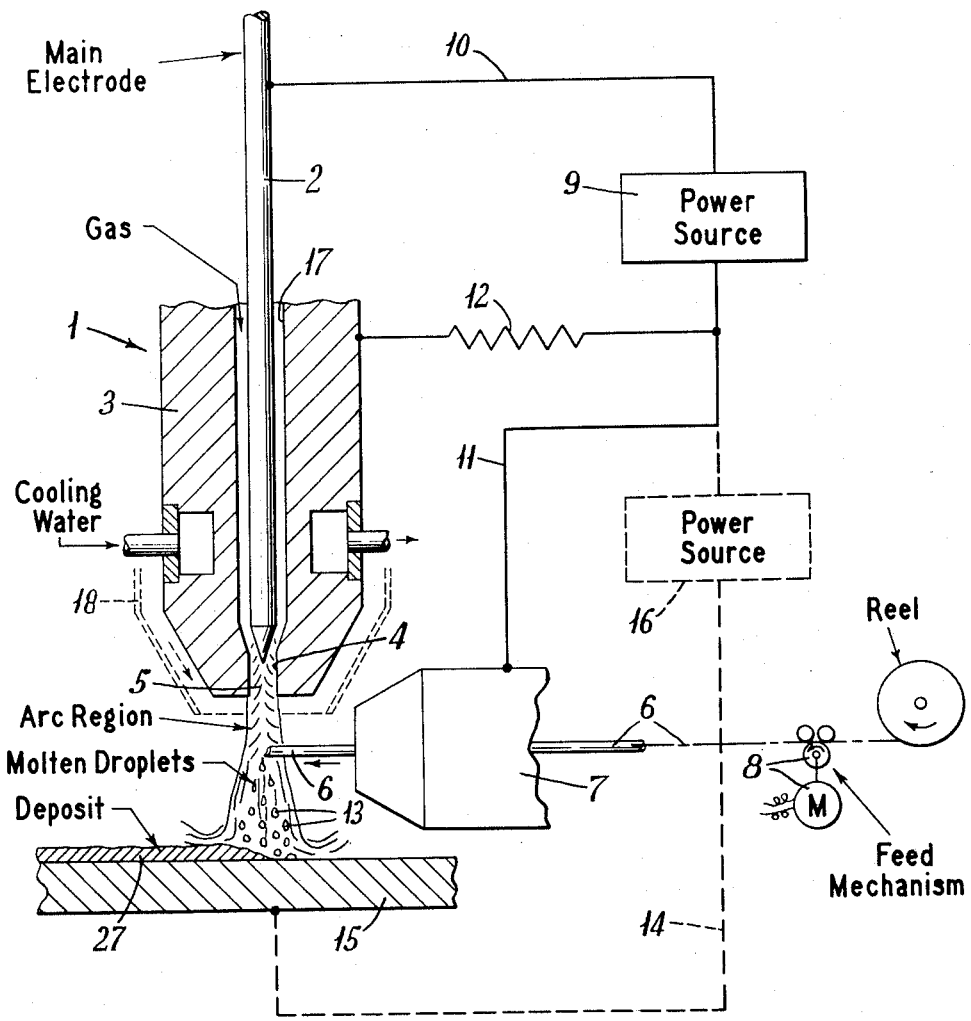

2,847,555

HIGH PRESSURE ARC PROCESS AND APPARATUS

Donald M. Yenni, Williamsville, N. Y., assignor to Union Carbide Corporation, a corporation of New York Application October 11, 1955, Serial No. 539,870

12 Claims. (Cl. 219—76)

This invention relates to high pressure arcs, and more particularly to Gage type arcs which are disclosed in patent application, Serial No. 524,353, filed July 26, 1955, by Robert M. Gage, now Patent No. 2,806,124. Such arcs depend upon a novel effluent resulting from arc-constriction and/or direction and wall-stabilization that is referred to hereinafter as the arc torch principle.

According to the invention there is provided a new combination of an arc torch with wire feeding means such as a wire gun by means of which an arc circuit is completed. The end of such wire is melted as it is fed into the arc, the so-melted metal being projected by and with the effluent to a desired work-side. Desirable features of such combination are as follows: the torch electrode is protected from spatter; the arc is exceedingly stable and a pilot arc may be conveniently provided; the jet-like gas stream or effluent protects and projects molten metal supplied by the wire forcefully toward the work. The work may be heated by such effluent to any desired degree for control of penetration.

Further, according to the invention, there is provided a process which comprises energizing a high pressure arc between the ends of consumable and non-consumable electrodes, directing and wall stabilizing such arc to produce a jet-like effluent, feeding the consumable electrode into such effluent, producing a spray of material that is projected by and in the effluent toward a work-side.

More particularly, according to the invention, metal welding such as cladding of various materials, both conductors and non-conductors, can be accomplished by use of the arc torch principle, with the cladding metal supplied in wire form as a primary electrode. When the work is a metal member, a second arc circuit can be established to provide more heat at the work, and a welding process is provided in which a new order of control over the base-metal fusion is achieved.

The arc torch apparatus provides a stable arc with a virtually co-extensive high velocity gas stream or effluent. When the arc circuit is between the main electrode of the arc torch and a fusible metal such as a wire, the wire is rapidly melted and projected as a stream or spray of molten droplets. This spray can be directed onto a solid surface to provide an adherent coating or fill a weld V. The solid work surface receiving the spray may, if it is an electrical conductor, also be connected to the power source and be additionally heated by establishing an arc circuit to the work.

In the drawing:

The single figure is a circuit diagram illustrating the invention.

The drawing shows an arc torch 1 comprising a stick electrode 2 and a water-cooled nozzle 3 having an orifice 4 through which an electric arc 5 is established to the end of a metal wire or rod 6 to be melted. The wire 6, which is an electrode of the main arc, is continuously fed into the arc region through a gun 7 by suitable means 8 such as that used in sigma welding. An electrical power source 9 is connected across the arc torch electrode 2 and the consumable wire by conductors 10 and 11, respectively. Such power source 9 may be either direct current or alternating current, and may be any suitable electric welding power source. In the drawing a D. C. power source is shown connected to provide straight polarity (torch electrode negative). For example, a pilot arc is maintained between the torch electrode 2 and the orifice wall by connecting the nozzle 3 to the power supply 9 through a suitable impedance such as resistor 12. Additionally, when the sprayed material 13 is being deposited on an electrical conductor, another arc circuit 14 can be established to the work 15. One such arrangement with a separate power source 16 is shown in dotted lines.

The arc torch electrode 2 is a non-consumable type and may be either a conventional tungsten rod or an internally water-cooled electrode of copper. The former type is suitable for direct current of either polarity, and for alternating current. The water-cooled type is most suitable for DCRP (torch electrode positive) power and may be used with more active gases than can the tungsten type.

The material to be sprayed is conveniently supplied in wire or strip form so that it can be continuously fed into the arc and, of course, it must be an electrical conductor when it is one of the main arc electrodes, which is preferred. Aluminum, stainless steel, and plain steel, or other metals such as copper or its alloys can be used. Additionally, other materials or fluxes can conveniently be added as coatings on the wire or contained in the wire as in a tube. In this manner, wear-resistant materials such as carbides may be supplied.

A suitable gas is fed to the arc torch in the annular space between the electrode 2 and the axial passage 17 in the nozzle 3 which leads to the orifice 4. The arc torch gas may be any of the well-known shielding gases (argon, helium, hydrogen, etc.) used in welding processes, including such active gases as the chlorosilanes if desired. Additional gas shielding can easily be provided by means of an outer concentric gas cup 18 around the arc torch nozzle or by carrying out the entire process in an enclosed chamber.

A twin generator setup, as shown, was operated as follows. The arc torch to wire power source 9 delivered 195 amperes DCSP; gas flow was 10 C. F. H. argon, through a ⅛-inch orifice 4; ¹⁄₁₆-inch type 304 stainless steel wire 6 was fed at 150 I. P. M., and a current of 285 amperes was measured in lead 11. The current in the wire to base plate circuit 14 was 90 amperes DCRP. The workpiece 15 was a ¼-inch thick CR steel plate moving horizontally at 10 I. P. M. No special preparation of the workpiece was necessary. The arc lengths were: Arc torch electrode-to-wire ¼-inch+³⁄₁₆-inch electrode setback=⁷⁄₁₆-inch total arc length; wire-to-plate 1¼-inch; and the resulting deposit cross-section showed very shallow penetration. A heavy clad layer 27 of about .20 inch thick was formed and securely bonded to the base plate 15 with a penetration of less than ¹⁄₃₂-inch into the base plate. The single pass bead was about ⁵⁄₁₆-inch wide. It was impossible to pry the clad bead away from the steel base plate.

Aluminum, stainless steel, and plain steel wires also were fed into the arc torch as shown in the drawing without any circuit 14 from the wire to the work. Arc torch and wire currents of 120 to 200 amperes DCSP were used with 10 to 50 C. F. H. of argon through a ⅛-inch orifice producing a projected spray of molten metal from the wire. At suitable distances the sprayed metals were firmly attached to solid surfaces such as brick, CR steel and aluminum. Closed wire-to-work spacing of about ¼ to ½-inch resulted in the piercing of holes in the work base material including the brick. Projected into space, the spray was forcefully thrown over ten feet horizontally. This demonstrated that cladding operations can be done in any position.

This cladding process is also a good method of joining metals. The arc circuits can be so controlled that any degree of base metal melting can be accomplished. Thus the dilution of the weld metal is controlled. This dilution factor is of prime importance in the fabrication of metals such as cast iron, aluminum and certain high alloy special purpose steels. Mild steel ¼-inch plate with a 60° included V edge preparation was welded with Oxweld No. 65 specially deoxidized steel wire, according to the invention. Examination of an etched cross-section of the weld showed almost no penetration of the weld metal into the base plate.

The term "high-pressure" arc as used herein is discussed (pages 290 and 326) by Cobine in his book, "Gaseous Conductors," published in 1941 by McGraw-Hill and is to be understood to relate to self-sustaining gas discharges in the general pressure range above $\frac{1}{20}$ atmosphere and generally in the current range of a few to thousands of amperes.

I claim:

1. The combination with an arc torch having an arc directing and wall-stabilizing orifice from which a high pressure arc effluent is discharged, a wire gun for directing a metal wire continuously toward said effluent, and a source of current connected to said torch and to said gun for energizing a high pressure arc, said arc melting the end of such wire as it is fed thereto, and the so-melted metal being projected by and with said effluent.

2. In combination, an arc torch comprising a stick electrode, an annular electrode surrounding said stick electrode and providing a gas nozzle; means for electrically connecting said stick electrode to one terminal of a source of current, and means including an impedance for electrically connecting said annular electrode to the other terminal of said current source for establishing a pilot arc between said electrodes; means for feeding a metal wire toward the projected axis of said arc torch at a selected speed; and means for electrically connecting such other terminal of said current source for energizing a high pressure arc between said stick electrode and the end of such wire.

3. In combination, an arc torch comprising a non-consumable electrode, means for feeding a consumable electrode toward the discharge of said arc torch, means for connecting said electrodes across a power source to energize an arc between the ends thereof for producing an effluent comprising a spray of molten droplets supplied by such consumable electrode, and means for connecting another source of power across such consumable electrode and a workpiece for controlling the application of such spray, said effluent acting to maintain a secondary arc between said consumable electrode and workpiece by ionizing some of the gas therebetween.

4. Process which comprises energizing a high pressure arc between the ends of consumable and non-consumable electrodes, directing and wall-stabilizing such arc to produce a jet-like effluent, feeding the consumable electrode into such effluent, producing a spray of material that is projected by and in the effluent toward a work-site.

5. Process which comprises energizing high pressure arcs between a non-consumable electrode and a consumable electrode and between said consumable electrode and a workpiece, directing and wall-stabilizing the arc from said non-consumable electrode to said consumable electrode, adjacent the end of said non-consumable electrode to project a jet-like effluent in the direction of said workpiece, and feeding said consumable electrode into such effluent for disintegrating and applying a spray thereof with such effluent.

6. Process of cladding a workpiece which comprises discharging gas through a nozzle having an orifice, energizing a high pressure arc between the end of an electrode disposed within such nozzle, and the end of consumable wire electrode positioned adjacent the path of such gas discharge, directing and wall-stabilizing such arc with said orifice to produce a current-carrying jet of effluent the heat of which disintegrates such wire electrode, feeding such wire electrode into such jet, and applying the resulting spray to the workpiece to clad the surface thereof with such disintegrated material.

7. Process of cladding as defined by claim 6, in which another arc is energized between the end of such consumable wire electrode and the workpiece for controlling the penetration of the cladding in the workpiece, such effluent acting to keep said latter arc in operation by ionizing some of the gas between the end of said consumable wire electrode and the workpiece.

8. The combination with a wall-stabilized high-pressure arc torch, of means for continuously feeding an electrode into the high-pressure arc effluent, that is discharged by said torch, and a high-pressure arc energizing circuit including said electrode, whereby such electrode is progressively disintegrated by such effluent and projected therewith in the form of a spray.

9. Process which comprises discharging a wall-stabilized high-pressure arc effluent from a constricted arc torch, and feeding the end of an electrode into such effluent, energizing a high-pressure arc through said electrode, whereby such electrode is progressively disintegrated by such effluent and projected therewith in the form of a spray.

10. In combination, an arc torch comprising a non-consumable electrode, means for feeding a consumable electrode toward the discharge of said arc torch, means for connecting said electrodes across a power source to energize an arc between the ends thereof for producing an effluent comprising a spray of molten droplets supplied by such consumable electrode, and means for connecting a workpiece in the arc circuit for controlling the application of such spray, said effluent acting to maintain a secondary arc circuit between said non-consumable electrode and workpiece.

11. Process as defined in claim 4, in which said effluent between said non-consumable electrode and workpiece is electrically energized.

12. Process of cladding as defined in claim 6, in which the jet of effluent between the wire electrode and workpiece conducts an electric current.

References Cited in the file of this patent

UNITED STATES PATENTS

| 1,002,721 | Mathers | Sept. 5, 1911 |
| 1,243,795 | Apple | Oct. 23, 1917 |
| 2,308,510 | Herman | Jan. 19, 1943 |
| 2,571,684 | Craven | Oct. 16, 1951 |